(12) United States Patent
Knudsen

(10) Patent No.: US 11,459,482 B2
(45) Date of Patent: Oct. 4, 2022

(54) ICEPHOBIC COATING AND COATED ARTICLES

(71) Applicant: Pall Corporation, Port Washington, NY (US)

(72) Inventor: Bernard Knudsen, Safety Harbor, FL (US)

(73) Assignee: Pall Corporation, Port Washington, NY (US)

( * ) Notice: Subject to any disclaimer, the term of this patent is extended or adjusted under 35 U.S.C. 154(b) by 140 days.

(21) Appl. No.: 16/906,560

(22) Filed: Jun. 19, 2020

(65) Prior Publication Data

US 2021/0395560 A1    Dec. 23, 2021

(51) Int. Cl.
*C09D 163/00*      (2006.01)
*C09D 7/20*        (2018.01)
(Continued)

(52) U.S. Cl.
CPC ........... *C09D 163/00* (2013.01); *B05D 3/108* (2013.01); *B05D 5/00* (2013.01); *C08L 83/08* (2013.01);
(Continued)

(58) Field of Classification Search
CPC ...... C09D 163/00; C09D 163/04; C08L 83/08
See application file for complete search history.

(56) References Cited

U.S. PATENT DOCUMENTS

| 5,679,458 A | 10/1997 | Cho et al. |
| 5,824,421 A * | 10/1998 | Kobayashi ............... C09D 7/65 525/464 |

(Continued)

FOREIGN PATENT DOCUMENTS

| CN | 1098429 A | 2/1995 |
| CN | 102575068 A | 7/2012 |

(Continued)

OTHER PUBLICATIONS

Singapore Intellectual Property Office, Search Report in counterpart Singapore Patent Application No. 10202105357T, dated Dec. 31, 2021.

(Continued)

*Primary Examiner* — Liam J Heincer
(74) *Attorney, Agent, or Firm* — Leydig, Voit & Mayer, Ltd.

(57) ABSTRACT

Provided is an icephobic coating composition comprising an epoxy resin comprising poly(phenyl glycidyl ether)-co-formaldehyde and a curing agent; a fluoro-substituted poly(alkyl siloxane) resin; and a solvent mixture comprising a first solvent with Hansen solubility parameters of $14 \leq \delta_D \leq 17$, $6 \leq \delta_P \leq 13$, and $4 \leq \delta_H \leq 8$; and a second solvent with Hansen solubility parameters of $16 \leq \delta_D \leq 19$, $4 \leq \delta_P \leq 9$, and $11 \leq \delta_H \leq 15$. Further provided is a coated filter comprising a porous medium having an upstream surface and a downstream surface, in which at least the upstream surface has a coating formed from the coating composition. Coated articles and methods of forming coated articles and inhibiting ice formation also are described.

19 Claims, 12 Drawing Sheets

(51) Int. Cl.
  *B05D 3/10* (2006.01)
  *B05D 5/00* (2006.01)
  *C09D 183/08* (2006.01)
  *C09D 5/00* (2006.01)
  *C09D 163/04* (2006.01)
  *C08L 83/08* (2006.01)

(52) U.S. Cl.
  CPC ............. *C09D 5/00* (2013.01); *C09D 7/20* (2018.01); *C09D 163/04* (2013.01); *C09D 183/08* (2013.01); *B05D 2401/10* (2013.01); *B05D 2504/00* (2013.01); *B05D 2506/10* (2013.01)

(56) References Cited

U.S. PATENT DOCUMENTS

| | | | | |
|---|---|---|---|---|
| 5,904,959 | A | * | 5/1999 | Martin ................ C09D 5/1675 427/256 |
| 5,936,022 | A | * | 8/1999 | Freeman ............ C09D 163/00 524/492 |
| 6,120,849 | A | | 9/2000 | Smith et al. |
| 6,702,953 | B2 | | 3/2004 | Simendinger et al. |
| 8,221,633 | B2 | | 7/2012 | Lam |
| 8,524,318 | B2 | | 9/2013 | Betting et al. |
| 8,877,839 | B2 | | 11/2014 | Veyland et al. |
| 9,090,797 | B2 | | 7/2015 | Tang et al. |
| 10,377,916 | B2 | | 8/2019 | Wohl, Jr. et al. |
| 10,472,539 | B2 | | 11/2019 | Schaefer et al. |
| 2002/0139956 | A1 | | 10/2002 | Simendinger, III et al. |
| 2006/0148974 | A1 | | 7/2006 | Yeh et al. |
| 2007/0269660 | A1 | * | 11/2007 | Killilea ................ C04B 41/71 428/414 |
| 2011/0143136 | A1 | * | 6/2011 | Hebert ................ B32B 27/322 428/355 EP |
| 2013/0273279 | A1 | * | 10/2013 | Zhou ................ C09D 163/00 427/386 |
| 2014/0127516 | A1 | * | 5/2014 | Wang ................ C08J 7/0427 528/53 |
| 2015/0240112 | A1 | | 8/2015 | Hulteen et al. |
| 2017/0107413 | A1 | | 4/2017 | Wang et al. |
| 2017/0204291 | A1 | | 7/2017 | Berry et al. |
| 2017/0369633 | A1 | | 12/2017 | Caruso Dailey et al. |
| 2018/0355189 | A1 | | 12/2018 | Huang et al. |
| 2020/0131375 | A1 | | 4/2020 | Chen et al. |
| 2020/0399461 | A1 | * | 12/2020 | Goodwin ................ C08L 61/12 |

FOREIGN PATENT DOCUMENTS

| | | | | |
|---|---|---|---|---|
| CN | 103788831 | A | | 5/2014 |
| CN | 104619741 | A | | 5/2015 |
| CN | 106232746 | A | | 12/2016 |
| CN | 106554500 | A | * | 4/2017 ......... C08G 59/5073 |
| CN | 106750329 | A | * | 5/2017 ............. C08G 81/00 |
| CN | 107001849 | A | | 8/2017 |
| CN | 107108913 | A | | 8/2017 |
| CN | 108300081 | A | | 7/2018 |
| CN | 108431149 | A | | 8/2018 |
| CN | 108610894 | A | | 10/2018 |
| CN | 110590831 | A | | 12/2019 |
| EP | 3 149 012 | A1 | | 4/2017 |
| JP | H9-151357 | A | | 6/1997 |
| JP | 2000-26844 | A | | 1/2000 |
| JP | 2000-283868 | A | | 10/2000 |
| JP | 2003-155319 | A | | 5/2003 |
| JP | 2003-155348 | A | | 5/2003 |
| JP | 2005-248171 | A | | 9/2005 |
| KR | 10-2008-0056405 | A | | 6/2008 |
| WO | WO 2016/090468 | A1 | | 6/2016 |
| WO | WO 2016/093159 | A1 | | 6/2016 |
| WO | WO 2018/001889 | A1 | | 1/2018 |

OTHER PUBLICATIONS

Japanese Patent Office, Office Action issued in counterpart Japanese Patent Application No. P2021-084737, dated Apr. 26, 2022.
Extended European Search Report in counterpart European Patent Application No. 21172221.0, dated Oct. 12, 2021.
China National Intellectual Property Administration, Office Action issued in counterpart Chinese Patent Application No. 202110645543.9, dated Jan. 24, 2022.

* cited by examiner

ICEPHOBIC COATING AND COATED ARTICLES

BACKGROUND OF THE INVENTION

Icing conditions in aviation can lead to ice accumulation on an aircraft, which can have detrimental effects. Conventionally, a deicing fluid, a mixture of glycol and water, is heated and sprayed onto the aircraft to remove ice and snow. A second anti-icing fluid with a similar, more concentrated, composition as the deicing fluid may optionally be applied to prevent further icing. However, the process of applying deicing fluid, including the speed and thoroughness, affects its ability to prevent ice accumulation. The deicing coating is temporary and surfaces must be recoated each time icing conditions are present. Moreover, deicing fluid is applied to the external surface of the aircraft and not to internal parts that can also be susceptible to icing.

Additionally, ice can be formed on various components in an aircraft, such as fuel filters, manifolds, and valves, when the aircraft is flying at altitude, and the accumulation of ice on these components can have adverse effects on the aircraft. In particular, the accumulation of ice on an aircraft fuel filter can interrupt or adversely affect the performance of the aircraft engine.

Therefore, there remains a need to prevent ice accumulation on surfaces with a permanent coating.

BRIEF SUMMARY OF THE INVENTION

The invention provides a coating composition comprising an epoxy resin comprising poly(phenyl glycidyl ether)-co-formaldehyde and a curing agent; a fluoro-substituted poly (alkyl siloxane) resin; and a solvent mixture comprising (i) a first solvent with Hansen solubility parameters of $14 \leq \delta_D \leq 17$, $6 \leq \delta_P \leq 13$, and $4 \leq \delta_H \leq 8$; and (ii) a second solvent with Hansen solubility parameters of $16 \leq \delta_D \leq 19$, $4 \leq \delta_P \leq 9$, and $11 \leq 5H \leq 15$.

Further provided is a method of forming a coated article, such as a filter, comprising applying the coating composition to at least a portion of the surface of the article. The coated article will shed ice and inhibit ice formation. In addition, the coated article will not absorb water or act as a coalescer, since the coating is not hydrophobic or hydrophilic. Accordingly, provided is a coated filter comprising a porous medium having an upstream surface and a downstream surface, wherein at least the upstream surface has a coating formed from the coating composition.

The invention also provides a method of inhibiting ice formation on a surface of an article comprising applying the coating composition to at least a portion of the surface of the article, and curing the coating composition to provide a coating comprising different layers with differing compositions.

BRIEF DESCRIPTION OF THE SEVERAL VIEWS OF THE DRAWING

FIG. 5A shows an isometric side view; FIG. 5B shows an isometric front view; and FIG. 5C shows a top view.

FIG. 6A shows an isometric side view; FIG. 6B shows an isometric front view; and FIG. 6C shows a top view.

FIG. 7A shows an isometric view; FIG. 7B shows a section view; and FIG. 7C is an enlarged view of detail B shown in FIG. 7B.

DETAILED DESCRIPTION OF THE INVENTION

Figure 1:
FIG. 1 is a schematic illustration of an icephobic coating of the invention.
Figure 2:
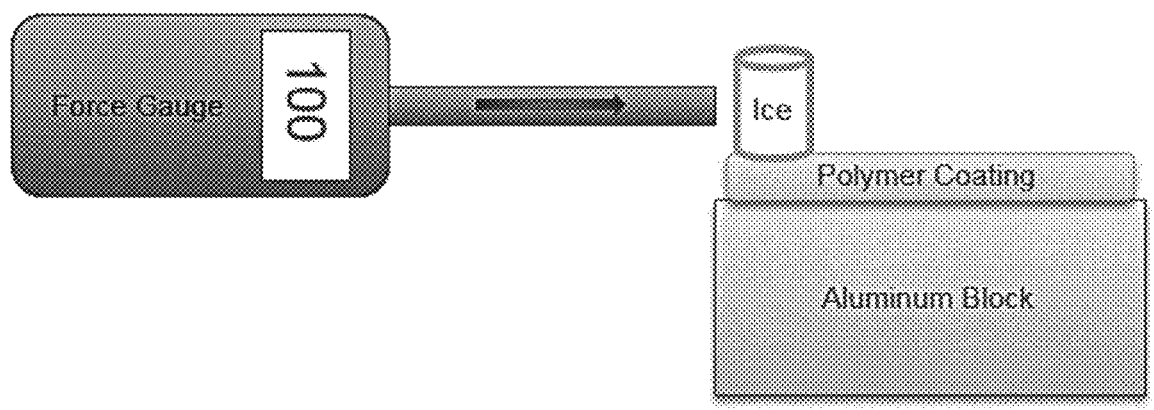
FIG. 2 is a scheme illustration of a testing technique for measuring ice adhesion on a coating of the invention.

The invention provides a coating composition that when applied to a surface of an article, a permanent icephobic coating is formed on the surface. In addition to being icephobic, the coating can further be used to prevent other adhesives from adhering to the coated substrate. Accordingly, provided is a coating composition comprising an epoxy resin comprising poly(phenyl glycidyl ether)-co-formaldehyde and a curing agent; a fluoro-substituted poly (alkyl siloxane) resin; and a solvent mixture comprising (i) a first solvent with Hansen solubility parameters of $14 \leq \delta_D \leq 17$, $6 \leq \delta_P \leq 13$, and $4 \leq \delta_H \leq 8$; and (ii) a second solvent with Hansen solubility parameters of $16 \leq \delta_D \leq 19$, $4 \leq \delta_P \leq 9$, and $11 \leq \delta_H \leq 15$. It has been discovered that the components of the coating composition enable the formation of a coating layer on the surface of a substrate with high temperature and chemical resistance and low mechanical flexibility.

If the coated article is an aircraft fuel filter, the icephobic coating may allow the filter size and weight to be reduced since extra ice holding capacity might not be needed.

The epoxy resin comprises poly(phenyl glycidyl ether)-co-formaldehyde and a curing agent. Other components can be present in the epoxy resin, such as a catalyst and/or diluent, if necessary, to enable the formation of the coating layer. The poly(phenyl glycidyl ether)-co-formaldehyde can be an epoxyphenol polymer of formula (I):

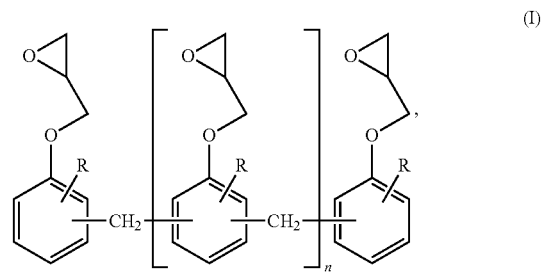

in which R is H or an alkyl (e.g., methyl, ethyl, propyl, butyl), and the connections between benzene rings are ortho-ortho, ortho-para, and/or para-para. The number average molecular weight of the poly(phenyl glycidyl ether)-coformaldehyde is typically about 2,000 g/mol or less (e.g., about 1500 g/mol or less, about 1200 g/mol or less, about 1000 g/mol or less, about 800 g/mol or less, about 700 g/mol or less, or about 600 g/mol or less). A specific example of the poly(phenyl glycidyl ether)-co-formaldehyde has CAS Registry Number 28064-14-4 (number average molecular weight of about 570 g/mol). The epoxyphenol polymer can be purchased commercially or synthesized from a novolac polymer and epichlorohydrin. A novolac polymer is known in the art as a low molecular weight polymer derived from phenol and formaldehyde.

The curing agent is any suitable epoxy resin curing agent, such as an amine (e.g., an aliphatic amine, a modified aliphatic amine, a cycloaliphatic amine, an aromatic amine, an amidoamine, a polyamide, and adducts thereof), an acid (organic acids, such as carboxylic acids, and acid anhydrides thereof), a phenol, an alcohol, a thiol, or any combination thereof. Specific examples of the curing agent include, e.g., aminoethylpiperazine, diethylenetriamine, triethylenetetramine, tetraethylenepenatamine, methylene dianiline, N-(2-hydroxypropyl)ethylenediamine, 2-methylimidazole, 2-ethyl-4-methylimiazole, dicyanodiamide, hexahydrophthalic anhydride, melamine, phenol, urea formaldehyde, an amine complex with boron trifluoride (e.g., boron trifluoride monoethylamine), an amine complex with boron trichloride (e.g., boron trichloride N,N-dimethyloctylamine), benzyl dimethylamine, isobutyric acid, hexanoic acid, pivalic acid, hydroxy-pivalic acid, cyclohexanecarboxylic acid, 1-methylcyclohexanecarboxylic acid, benzoic acid, 2-methyl-benzoic acid, 3-methoxybenzoic acid, 3-methoxybenzoic acid, 2-ethoxy-benzoic acid, 4-ethoxy-benzoic acid, phenol, nonylphenol, an aliphatic alcohol-alkylene oxide adduct, methanedithiol, propanedithiol, cyclohexanedithiol, 2-mercaptoethyl-2,3-dimercaptosuccinate, 2,3-dimercapto-1-propanol (2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris((3-thiopropionate), di-, tris- or tetra-mercaptobenzene, bis-, tris- or tetra-(mercaptoalkyl)benzene, bis-, tris- or tetra(mercaptoalkylthio)alkane, dimercaptobiphenyl, toluenedithiol, naphthalenedithiol, amino-4,6-dithiol-sym-triazine, alkoxy-4,6-dithiol-sym-triazine, aryloxy-4,6-dithiol-sym-triazine, 1,3,5-tris(3-mercaptopropyl) isocyanurate, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol, 2,5-dimercapto-1,3,4-thiadiazol, and combinations thereof. In a preferred embodiment, the curing agent is an amine, such as an amine adduct (e.g., boron trichloride N,N-dimethyloctylamine).

Preferably, the epoxy resin is a one-part system, in which the poly(phenyl glycidyl ether)-co-formaldehyde and curing agent are in the same container prior to use. In some embodiments, the epoxy resin has a glass transition temperature less than the operating temperature of the article to be coated. For example, the glass transition temperature of the epoxy resin can be less than about 153° C. (e.g., less than about 145° C., less than about 140° C., less than about 135° C., or less than about 130° C.). In any of the embodiments of the epoxy resin, the epoxy resin is clear, stable at room temperature (e.g., has a stable shelf life for 6 months at room temperature), contains no filler, and/or is not degraded in aerospace fluid heat soak (e.g., SKYDROL™, Jet-A, MIL-PRF-23699, and MIL-PRF-83282).

The fluoro-substituted poly(alkyl siloxane) resin is any fluorosilicone rubber that forms a suitable coating with the epoxy resin, as described herein. As used herein, the fluoro-substituted poly (alkyl siloxane) resin comprises a majority of diorganosiloxane units that contain at least one fluoro substituent (e.g., 1, 2, or 3 fluoro substituents, preferably 3 fluoro substituents). The term "majority" refers to at least 50 mol % (e.g., at least 60 mol %, at least 70 mol %, at least 80 mol %, or at least 90 mol %) of the polysiloxane includes fluoro-substituted diorganosiloxane units.

A fluoro-substituted poly(alkyl siloxane) resin can have formula (II):

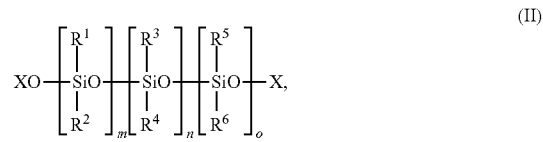

in which $R^{1-5}$ are the same or different and each is an alkyl, provided that at least one of $R^1$ and $R^2$ is a fluoro-substituted alkyl, $R^6$ is alkenyl, and each instance of X is the same or different and each is H or an alkyl-substituted silyl group. Subscript m is an integer of 1 to 1000, subscript n is 0 or an integer of 1 to 500, and o is 0 or an integer of 1 to 500. The repeat units associated with m, n, and o can be randomly arranged in each polymer chain. In some embodiments, (i) $R^1$ is methyl, $R^2$ is 3,3,3,-trifluoropropyl, and n and o are each 0, (ii) $R^1$, $R^3$, and $R^4$ are each methyl, $R^2$ is 3,3,3,-trifluoropropyl, and o is 0, and (iii) $R^1$, $R^3$, $R^4$, and $R^5$ are methyl, $R^2$ is 3,3,3-trifluoropropyl, and $R^6$ is ethenyl. In any of these embodiments, X is OH or —Si(Me)$_2$OH. Preferably the fluoro-substituted poly(alkyl siloxane) resin is a 3,3,3,-trifluoropropyl-substituted poly(alkyl siloxane) resin.

Preferably, the fluoro-substituted poly(alkyl siloxane) resin has a glass transition temperature less than the operating temperature of the article to be coated and/or is not degraded in aerospace fluid heat soak (e.g. SKYDROL™, Jet-A, MIL-PRF-23699, and MIL-PRF-83282).

In any of the embodiments herein, the term "alkyl" implies a straight-chain or branched alkyl substituent containing from, for example, from about 1 to about 45 carbon atoms (e.g., from about 1 to about 30 carbon atoms, from about 1 to about 20 carbon atoms, from about 1 to about 12 carbon atoms, from about 1 to about 8 carbon atoms, from about 1 to about 6 carbon atoms, or from about 1 to about 4 carbon atoms). Examples of alkyl group include methyl, ethyl, n-propyl, isopropyl, n-butyl, sec-butyl, isobutyl, tert-butyl, n-pentyl, isopentyl, n-hexyl, and the like. The alkyl can be substituted or unsubstituted, as described herein. In embodiments, the alkyl is substituted with 1 or more (e.g., 1, 2, 3, 4, 5, or 6) moieties, such as fluoro. Even in instances in which the alkyl is an alkylene chain (e.g., —(CH$_2$)$_n$—), the alkyl group can be substituted or unsubstituted as described herein.

In any of the embodiments herein, the term "alkenyl," as used herein, means a linear alkenyl substituent containing from, for example, about 2 to about 18 carbon atoms (e.g., from about 2 to about 12 carbon atoms, from about 2 to about 10 carbon atoms, from about 2 to about 8 carbon atoms, from about 2 to about 6 carbon atoms). In accordance with an embodiment, the alkenyl group is a $C_2$-$C_4$ alkenyl.

Examples of alkenyl group include ethenyl, allyl, 2-propenyl, 1-butenyl, 2-butenyl, 1-pentenyl, 2-pentenyl, 3-pentenyl, 1-hexenyl, and the like. The alkenyl can be substituted or unsubstituted, as described herein.

The ratio of the epoxy resin to the fluoro-substituted poly(alkyl siloxane) resin is from about 85:15 to 60:40. It was discovered that if the amount of fluoro-substituted poly(alkyl siloxane) resin is less than 15 wt %, the coating will not effectively shed ice. It was further discovered that if the epoxy resin is less than 60 wt %, the epoxy will not form a robust surface. In certain embodiments, the epoxy resin to the fluoro-substituted poly(alkyl siloxane) resin is from about 80:20 to 70:30, especially about 80:20.

In some embodiments, the coating composition does not contain a polysilane.

The coating composition includes a solvent mixture comprising two solvents best defined by their Hansen solubility parameters (HSP). Hansen Solubility Parameters are listed in Hansen, C., Hansen Solubility Parameters, A User's Handbook, 2nd Edition, 2007, which is incorporated herein by reference in its entirety. The HSPs define a solvent based on three parameters: $\delta_D$, which characterizes the energy from dispersion forces between molecules, $\delta_P$, which characterizes the energy from dipolar intermolecular force between molecules, and 5H, which characterize the energy from hydrogen bonds between molecules. While theory, these values are well established and can be found in many databases. Preferably, the epoxy resin and fluoro-substituted poly(alkyl siloxane) resin are at least partially or fully soluble in the solvent mixture.

The first solvent has Hansen solubility parameters of $14 \leq \delta_D \leq 17$, $6 \leq \delta_P \leq 13$, and $4 \leq \delta_H \leq 8$. In some embodiments, the first solvent has HSPs of $15 \leq \delta_D \leq 17$, $7 \leq \delta_P \leq 11$, and $5 \leq \delta_H \leq 7.5$. Suitable first solvents include, for example, acetone, methyl ethyl ketone, methyl propyl ketone, butyl glycol acetate, 1-nitropropane, methyl acetate, and propylene glycol monoethyl ether acetate. Preferably, the first solvent is acetone.

The second solvent has Hansen solubility parameters of $16 \leq \delta_D \leq 19$, $4 \leq \delta_P \leq 9$, and $11 \leq \delta_H \leq 15$. In some embodiments, the second solvent has HSPs of $17 \leq \delta_D \leq 18.5$, $4 \leq \delta_P \leq 8.2$, and $12 \leq \delta_H \leq 14.5$. Suitable second solvents include, for example, benzyl alcohol, 2-phenoxyethanol, tetrahydrofurfuryl alcohol, cyclohexanol, propylene glycol phenyl ether, 2-chlorophenol, and hexylene glycol. Preferably, the second solvent is benzyl alcohol.

The solvent mixture comprises any suitable ratio of the first solvent to the second solvent that enables the formation of a coating layer as described herein. In certain embodiments, the ratio of first solvent to the second solvent can be from 90:10 to 98:2. The first solvent is present in a higher amount to help dissolve the fluoro-substituted poly(alkyl siloxane) resin. In preferred embodiments, the ratio of first solvent to second solvent is about 98:2. For example, the solvent mixture comprises about a 98:2 ratio of acetone: benzyl alcohol.

Figure 3A:
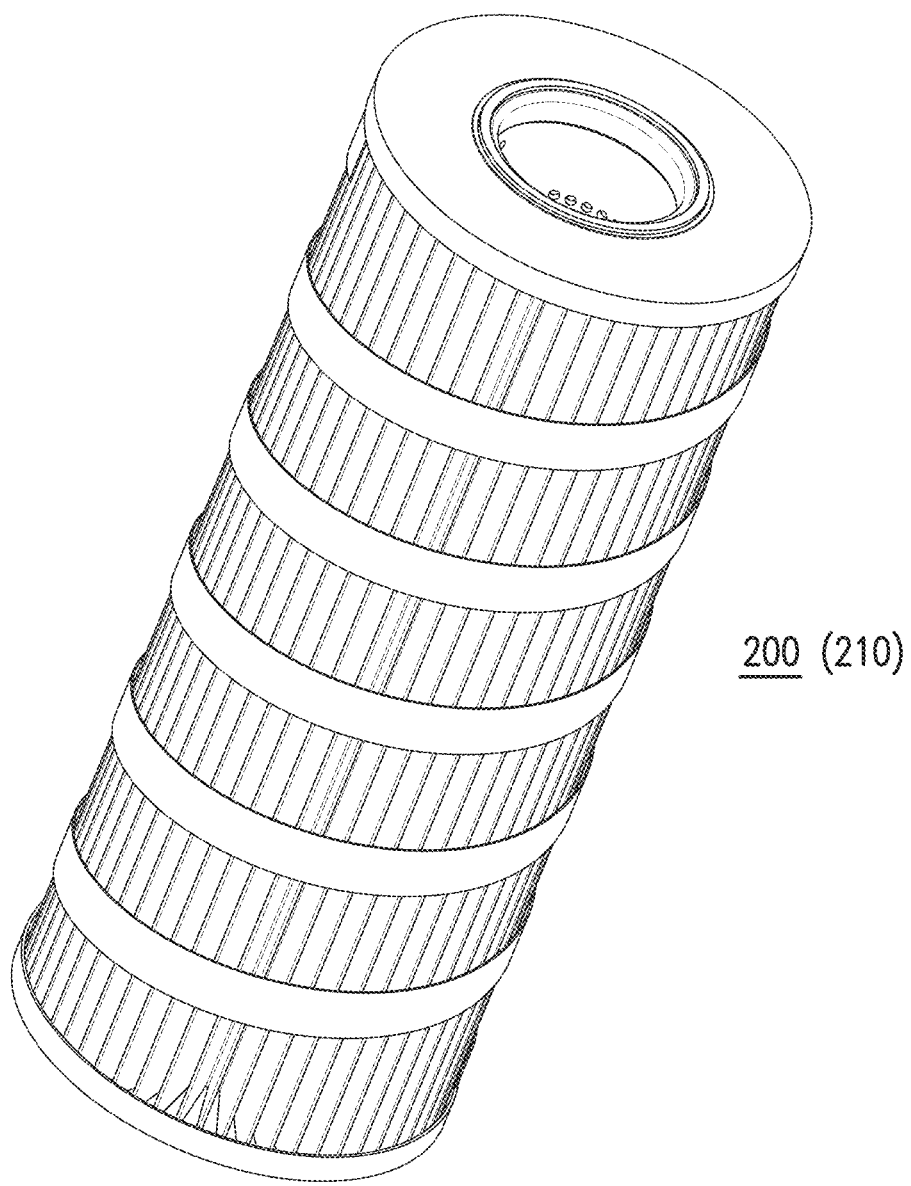
FIG. 3A is a perspective view of an illustrative aircraft fuel filter that can be coated in accordance with an embodiment of the invention.
Figure 3B:
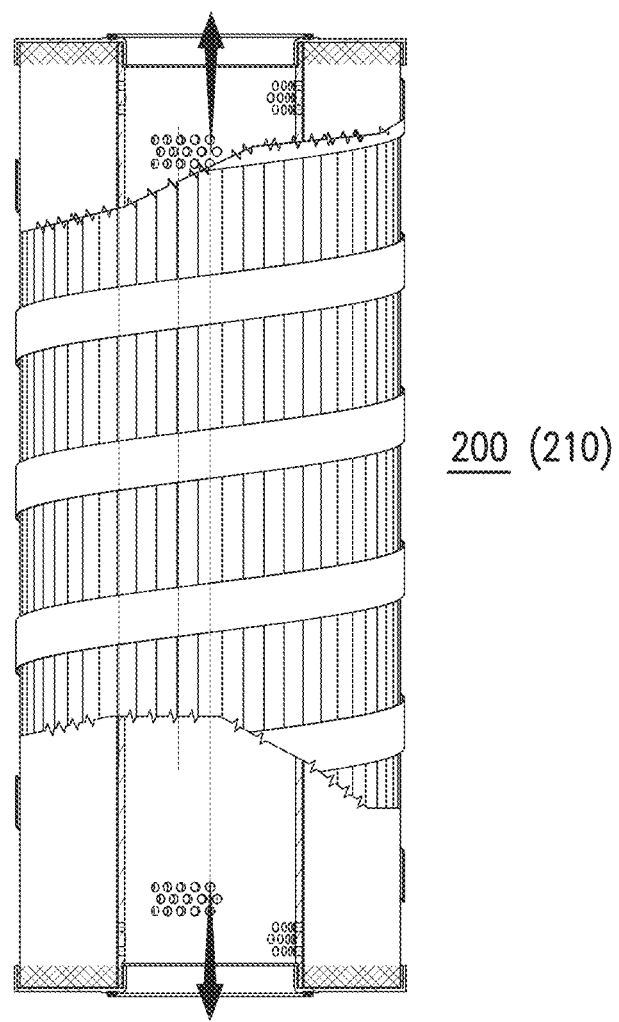
FIG. 3B is a partial cut-away view of the aircraft fuel filter shown in FIG. 3A.
Figure 4:
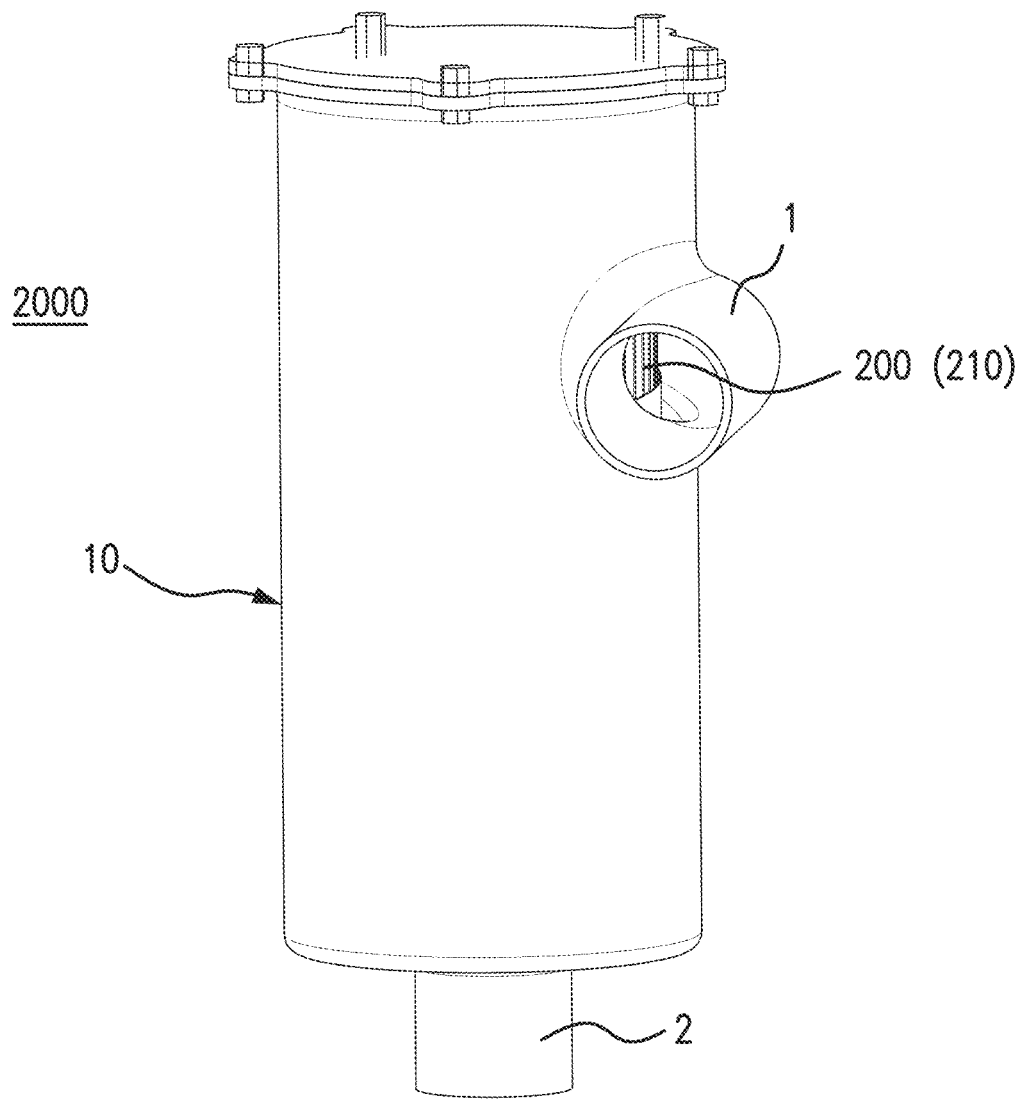
FIG. 4 is an isometric side view of an illustrative aircraft fuel filter device comprising an aircraft fuel filter device housing (shown containing a fuel filter) that can be coated in accordance with an embodiment of the invention.
Figure 5A:
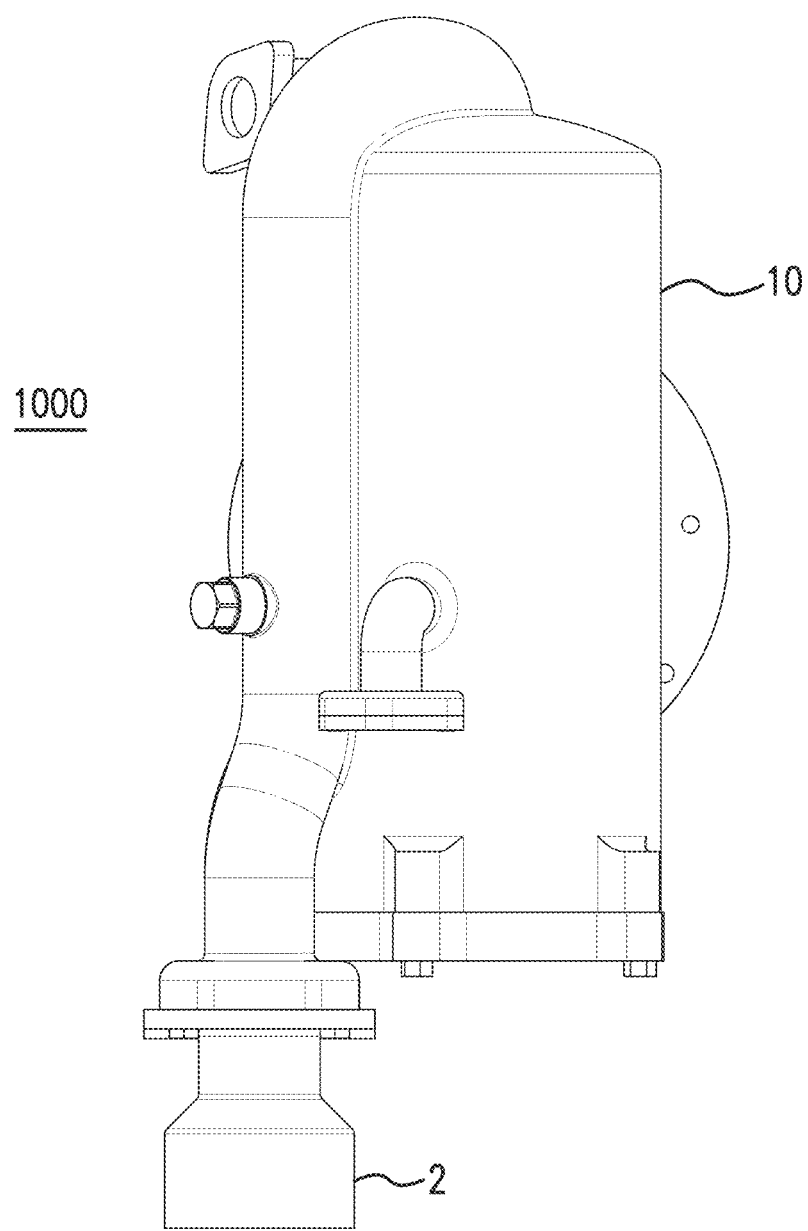
FIGS. 5A-5C show various views of another aircraft fuel filter housing that can be coated in accordance with an embodiment of the invention.
Figure 5B:
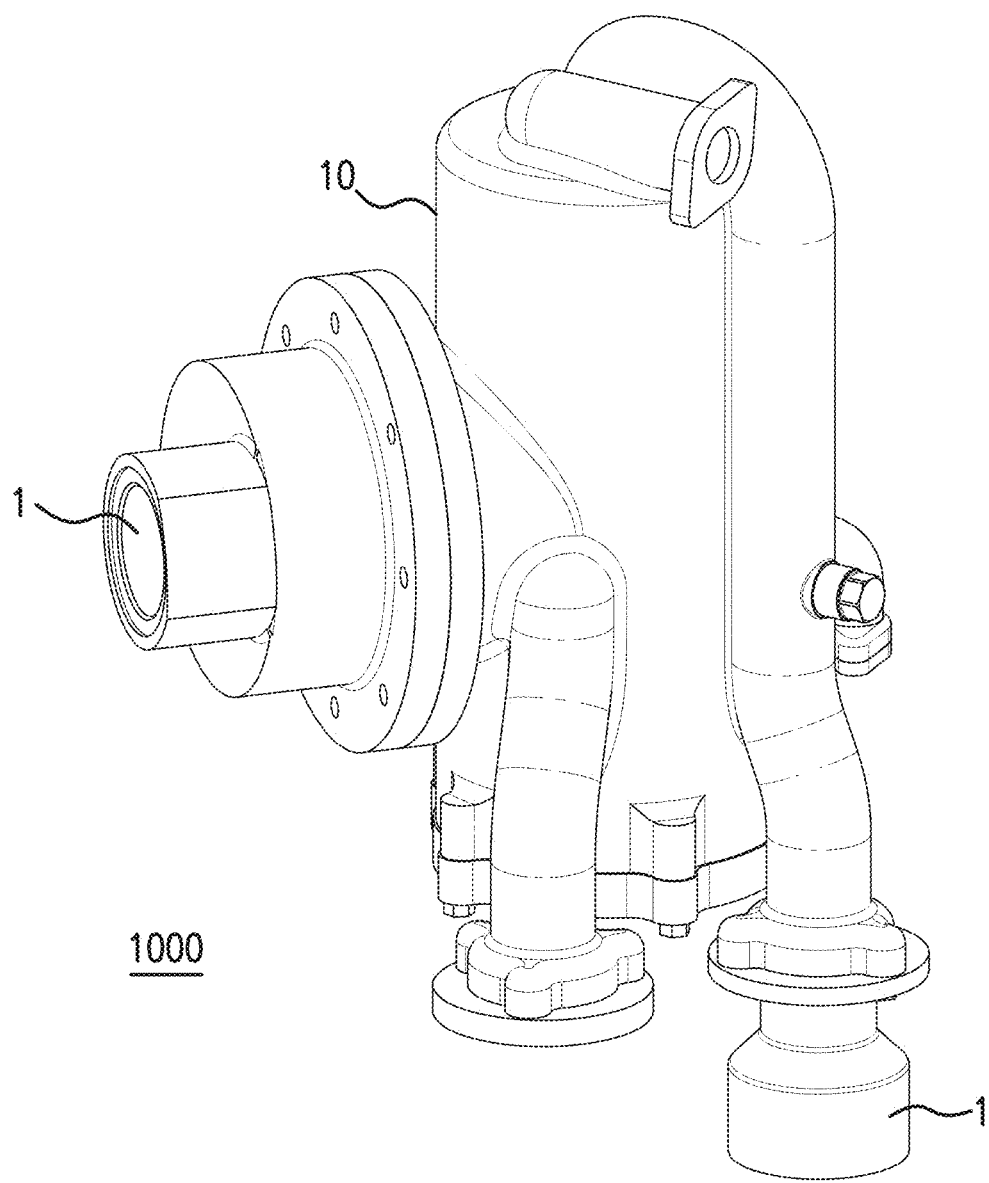
Figure 5C:
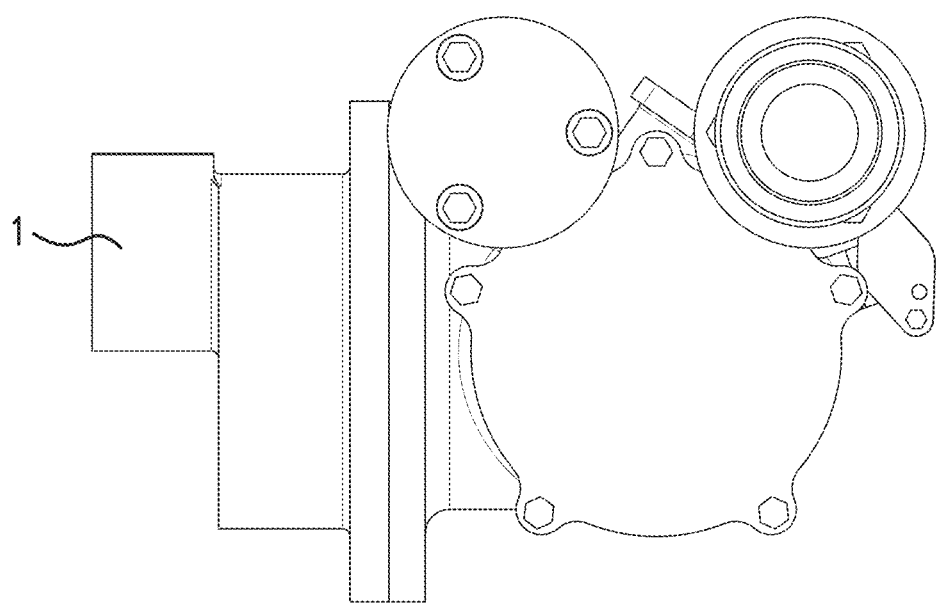
Figure 6A:
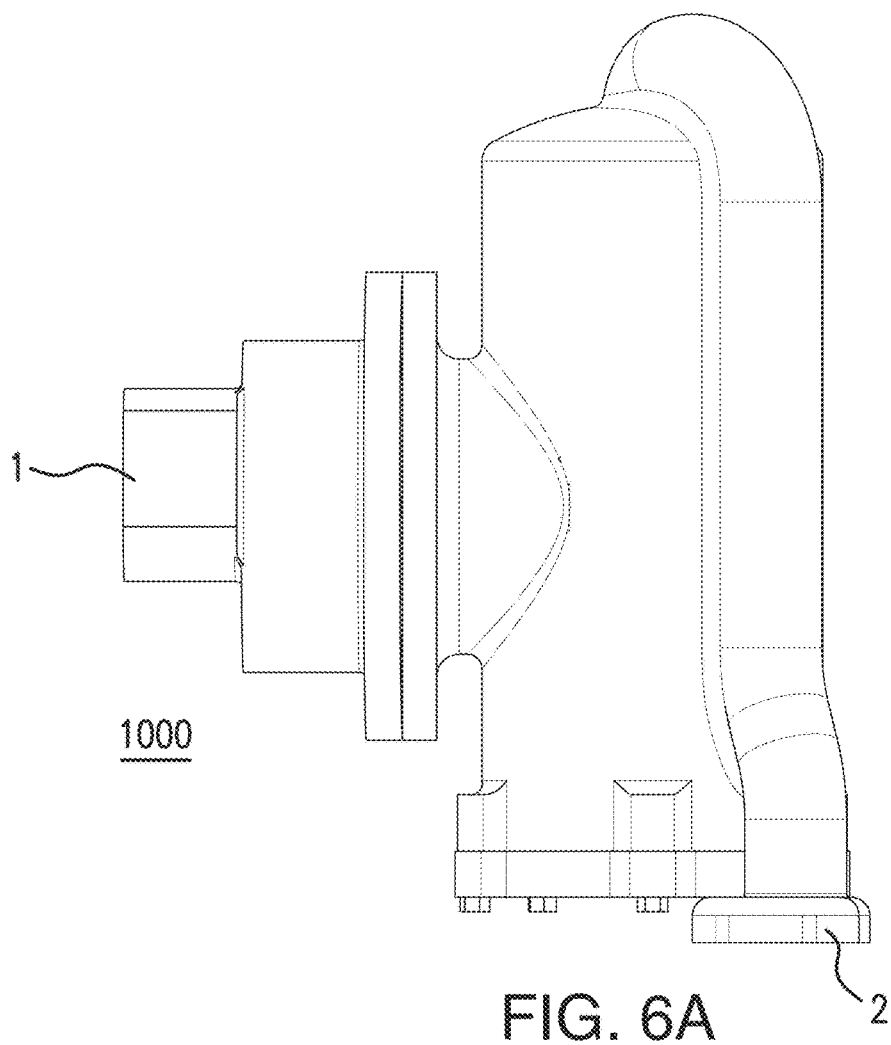
FIGS. 6A-6C show various views of yet another aircraft fuel filter housing that can be coated in accordance with an embodiment of the invention.
Figure 6C:
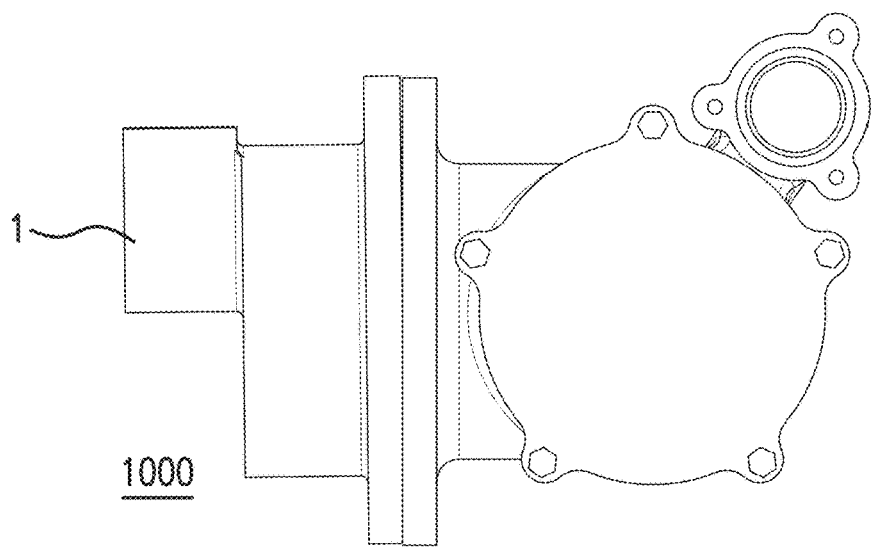
Figure 6B:
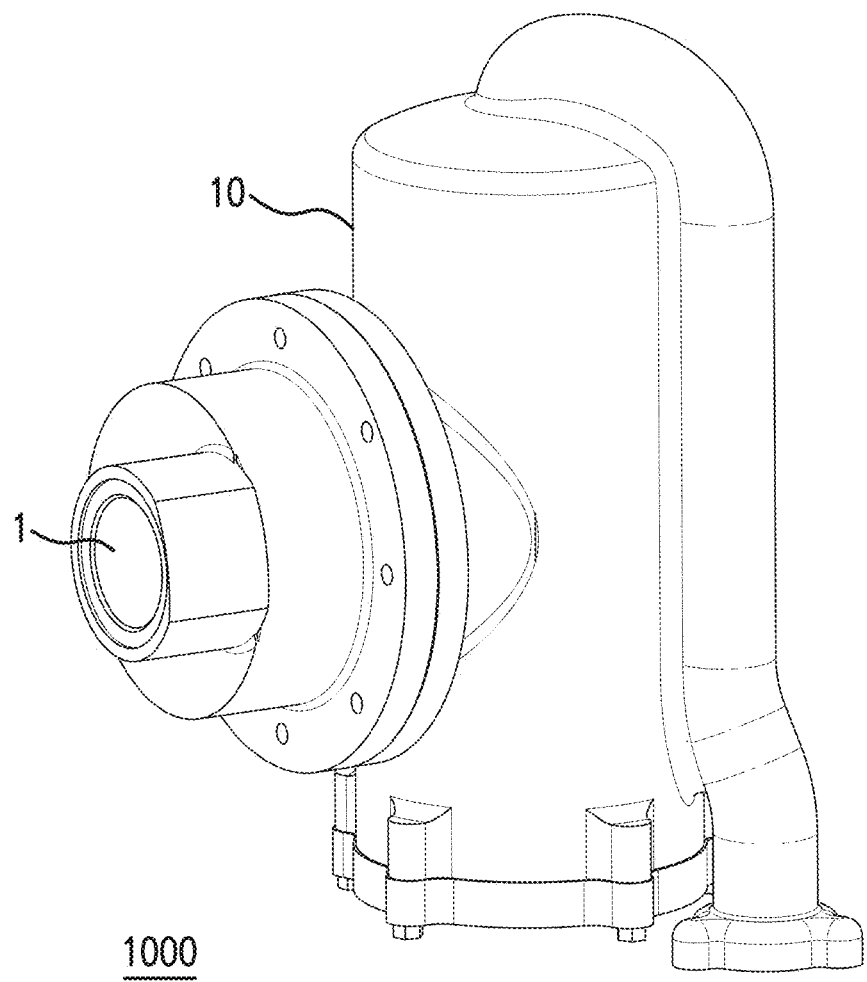
Figure 7A:
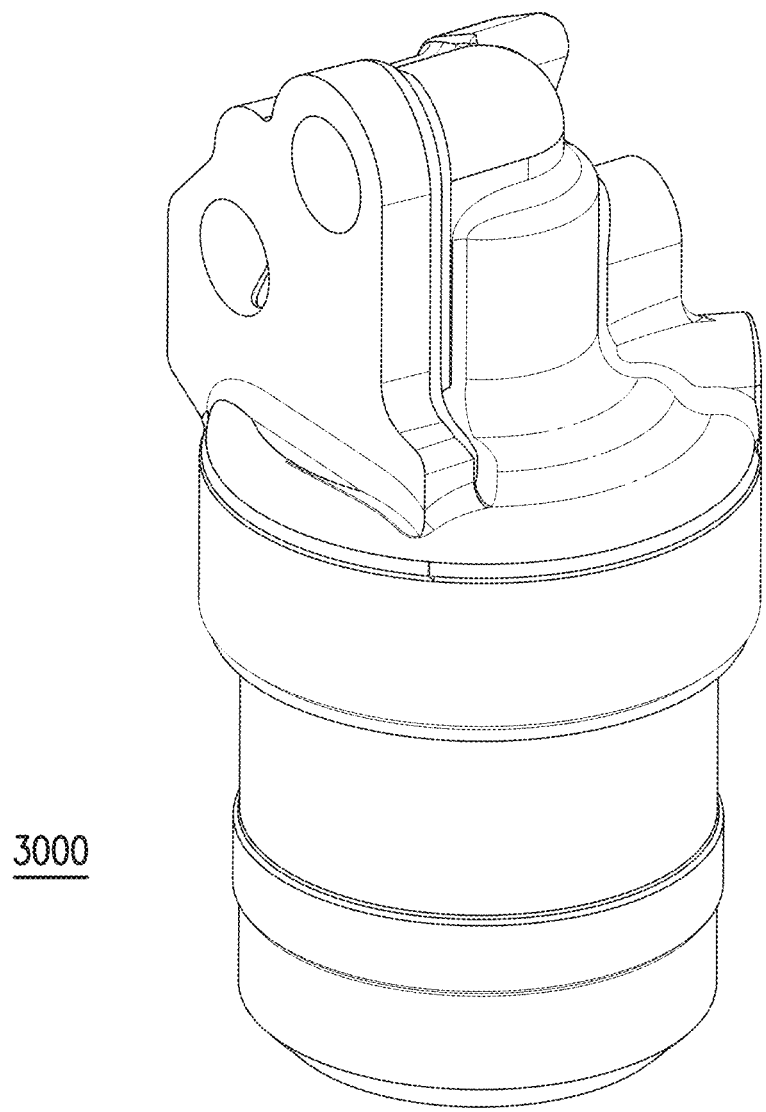
FIGS. 7A-7C show various views of a valve (shown as a bypass valve) and filter in a device for an aircraft, that can be coated in accordance with an embodiment of the invention.
Figure 7B:
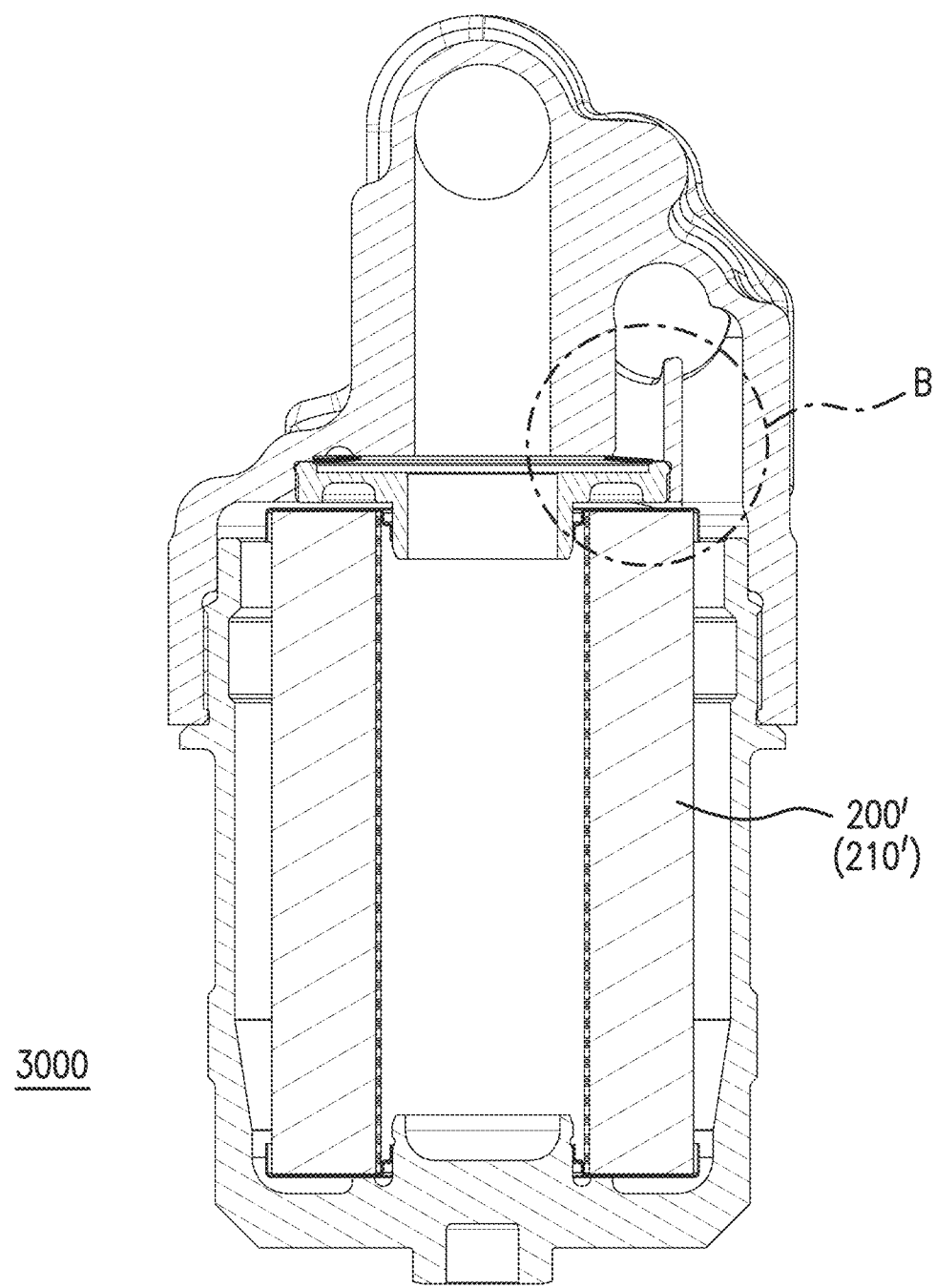
Figure 7C:
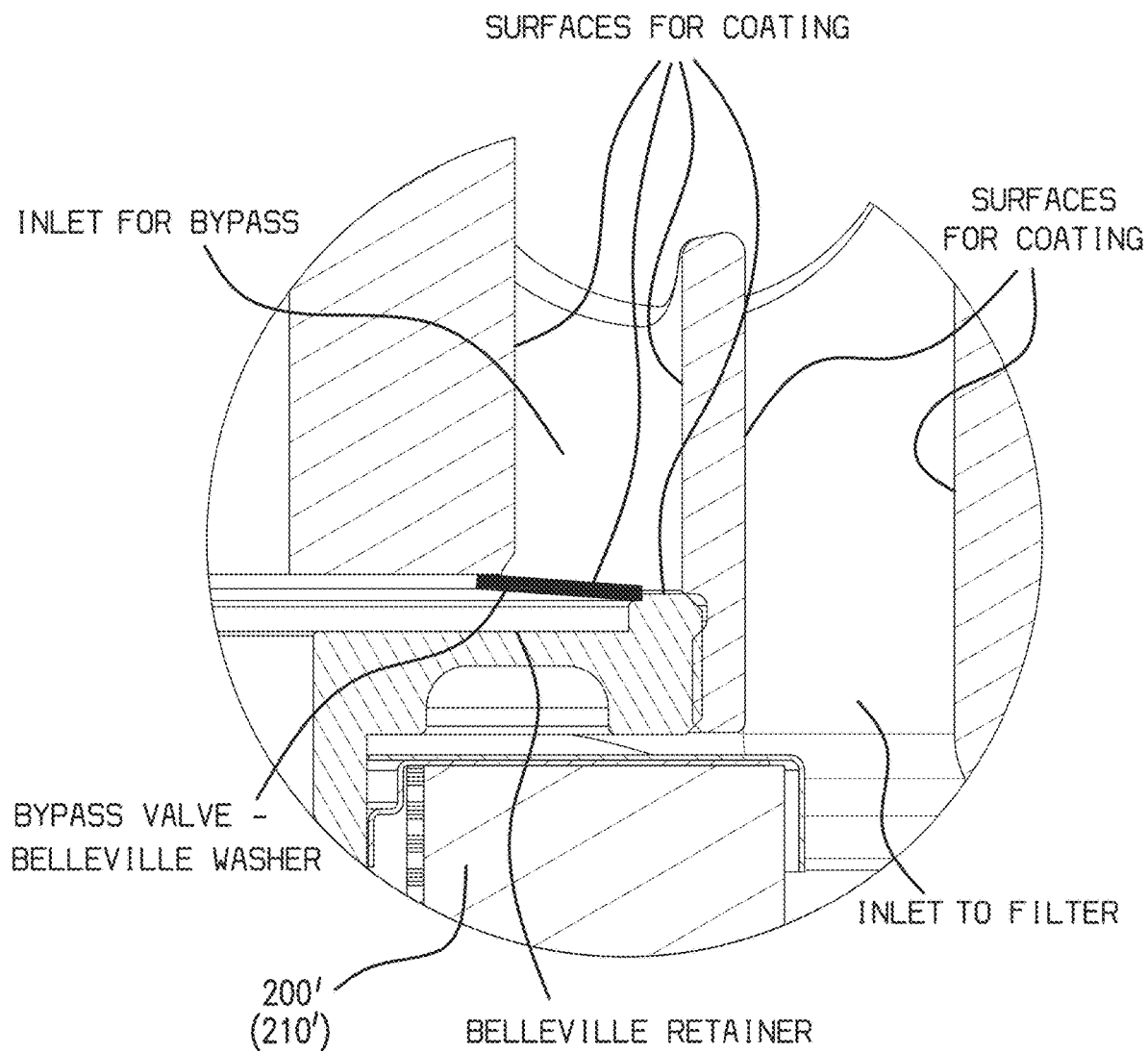

The invention provides a method of forming a coated article, such as a coated filter element and filter, (see, FIGS. 3A, and 3B, showing a filter 200 comprising a filter element 210 (shown as a pleated filter) also showing an inner filter core and an outer wrap), filter device (see, FIG. 4 showing a filter device 2000 comprising a main housing body 10, and inlet 1 and an outlet 2 with a porous filter 200 comprising a porous filter element 210 arranged in the housing across the fluid flow path from the inlet and the outlet), filter housing 1000 comprising a main housing body 10, an inlet 1, and an outlet 2 (see, FIGS. 5A-5C and 6A-6C), a manifold, and/or a valve (see, FIGS. 7A-7C, showing a device with a bypass valve with a filter). The method comprises applying the coating composition, as described herein, to at least a portion of at least one surface of the article. The method can further comprise preparing the coating composition prior to applying the coating composition. Accordingly, the method can comprise providing a mixed solvent comprising the first solvent and second solvent, dissolving the fluoro-substituted poly(alkyl siloxane) resin in the mixed solvent, and followed by dissolving the epoxy resin in the mixed solvent.

In some embodiments, the fluoro-substituted poly(alkyl siloxane) resin is added to the mixed solvent so that the solution comprises up to about 1.25 wt % (e.g., up to about 1.1 wt %, up to about 1 wt %) of dissolved fluoro-substituted poly(alkyl siloxane) resin. In particular, the fluoro-substituted poly(alkyl siloxane) resin can be dissolved in the mixed solvent by stirring and/or sonication. If necessary, the solution can be heated to a low temperature (e.g., about 30° C.), as long as care is taken to monitor and replace any lost first solvent. Any alternative mixing scheme can be used as long the desired solvent ratio is monitored and maintained.

The epoxy resin can be dissolved in the mixed solvent that contains the fluoro-substituted poly(alkyl siloxane) resin using stirring and/or sonication. As described herein, the stirring can be manual, mechanical, or both.

Application can comprise any suitable application technique, such as spraying, dipping, spinning, wiping, rolling, or a combination thereof. In preferred embodiments, the coating composition is applied using an adjustable spraying device to control the thickness of the coating. After the coating composition has been applied to the at least one surface, the coating composition can be further subjected to curing. Typically, the curing takes place after a majority of the first solvent has evaporated from the coating composition.

In preferred embodiments, the resulting coating is hard, smooth, continuous, and is not marred or damaged by common solvents (e.g., an alcohol or acetone).

The coating can have any thickness, as long as the coating can shed and repel ice. In general, the coating will have a thickness of at least about 1 μm (e.g., at least about 5 μm, at least about 10 μm, at least about 20 μm, at least about 50 μm, at least about 80 μm, at least about 100 μm, at least about 110 μm, at least about 120 μm, at least about 130 μm, at least about 140 μm, at least about 150 μm, at least about 160 μm, at least about 170 μm, at least about 180 μm, or at least about 190 μm). Typically, the coating will have a thickness of about 500 μm or less (e.g., about 400 μm or less, about 350 μm or less, about 300 μm or less, about 250 μm or less, about 200 μm or less, about 180 μm or less, about 150 μm or less, about 120 μm or less, about 100 μm or less, about 80 μm or less, about 50 μm or less, about 20 μm or less, or about 10 μm or less). Any two of the foregoing endpoints can be used to define a close-ended range, or a single endpoint can be used to define an open-ended range. For example, the coating can have a thickness of about 1-500 μm or about 10-100 μm or about 50-200 μm or about 100-180 μm. Spin-coated layers tend to be thicker (e.g., around 150 μm) compared to spray-coated layers (e.g., around 15 μm).

While the fluoro-substituted poly(alkyl siloxane) resin is soluble in the first solvent, the fluoro-substituted poly(alkyl siloxane) resin has very limited solubility in the second solvent. It was discovered that as the solvents in the solvent mixture evaporate at different rates, the fluoro-substituted poly(alkyl siloxane) resin becomes less soluble and migrates to the surface. When the solvent mixture contains about equal parts of the first and second solvents, the fluoro-substituted poly(alkyl siloxane) resin will fall out of solution and will form a solid floating on the surface of the still dissolved epoxy resin. The resulting coating layer has a gradient composition, which is subsequently cured. In particular, the gradient (stratified) structure of coating layer comprises an outermost layer opposite of the coated surface comprising a majority of the fluoro-substituted poly(alkyl siloxane) resin, an inner most layer adjacent to the coated surface comprising a majority of the epoxy resin, and an intervening layer between the outermost layer and innermost layer comprising a mixture of the fluoro-substituted poly (alkyl siloxane) resin and epoxy resin. See FIG. 1. Without wishing to be bound by any theory, it is believed that that the epoxy-rich layer is a thermoset layer that provides bond strength, heat resistance, and chemical resistance, whereas the fluoro-substituted poly(alkyl siloxane) resin-rich layer is a thermoplastic layer that provides ice shedding.

The article to be coated can be solid or permeable. In some embodiments, the article is porous, permeable, semipermeable, or permselective, and the removal rating can be in the range from microporous or coarser to ultraporous, nanoporous, or finer. Suitable depth filter materials have a porosity in the range from about 0.1 µm to about 100 µm (e.g., about 0.1-10 µm), from about 0.005 µm to about 0.1 µm, or from about 0.001 µm to about 0.01 µm, depending on the end use of the porous medium.

Moreover, the article can be made of any suitable material, such as a metallic material, a ceramic material, glass, a polymeric material, or a combination thereof.

Metal materials suitable for use in the invention include, for example, stainless steel, nickel, titanium, tantalum, aluminum, copper, gold, silver, platinum, zinc, nickel titanium alloy (nitinol), an alloy of nickel, chromium, and iron (INCONEL™, Special Metals, Corporation, Elkhart, Ind.), iridium, tungsten, silicon, magnesium, tin, galvanized steel, hot dipped galvanized steel, electrogalvanized steel, annealed hot dipped galvanized steel, alloys of any of the foregoing metals, coatings containing any of the foregoing metals, and combinations thereof. In some embodiments, the metallic material is sintered.

Ceramic materials suitable for use in the invention include, for example, oxides of the rare earths, of aluminates, of silicates, of titanates, boron nitride, silicon nitride, silicon carbide, alumina, silica, titanium dioxide, and combinations thereof. In some embodiments, the ceramic material is sintered.

Natural polymer materials suitable for use in the invention include, for example, a polysaccharide (e.g., cotton, cellulose), shellac, amber, wool, silk, natural rubber, and combinations thereof.

Synthetic polymer materials suitable for use in the invention include, for example, polyvinylpyrrolidone, acrylics, acrylonitrile-butadiene-styrene, polyacrylonitrile, acetals, polyphenylene oxides, polyimides, polystyrene, polypropylene, polyethylene (e.g., high density polyethylene), polydimethylsiloxane, polytetrafluoroethylene, polyvinylidene difluoride, polyvinyl chloride, polyethylenimine, polyesters, polyethers, polyamide, polyorthoester, polyanhydride, polysulfone, polyether sulfone, polycaprolactone, polyhydroxybutyrate valerate, polylactones, polyurethanes, polycarbonates, polyethylene terephthalate, as well as copolymers and combinations thereof. In some embodiments, the polymeric material is sintered.

In accordance with these methods, provided is a coated filter comprising a porous medium having an upstream surface and a downstream surface, in which at least the upstream surface has a coating formed from a coating composition described herein. FIGS. 3A, 3B, and 4 shows an illustrative filter element and an illustrative filter device comprising a porous medium that can be coated in accordance with an embodiment of the invention. The porous medium can be coated before assembling in a filter, or can be coated while the filter is partially assembled, or can be coated in the assembled filter. If desired, both the upstream and downstream surfaces of the porous medium can be coated. The porous medium forming the filter can comprise a pleated or spirally-wound permeable sheet having one or more layers, including a fitter medium layer, one or more drainage and/or support layers, and/or a cushioning layer. Alternatively, the porous medium can comprise a bundle of permeable hollow fibers or a permeable mass, e.g., a hollow cylindrical permeable mass. The porous medium can be fashioned, for example, as a woven or nonwoven sheet, a mesh, or a mass of filaments or fibers or as a permeable membrane, e.g., in the form of a sheet or hollow fibers. The porous medium to be coated can be a commercially available porous medium.

Further provided is a method of inhibiting ice formation on a surface of an article, particularly an filter element and filter (see, FIGS. 3A, and 3B, also showing an inner filter core and an outer wrap), filter device (see, FIG. 4), filter housing (see, FIGS. 5A-5C and 6A-6C), manifold, and/or valve (see, FIG. 7A-7C, showing a device 3000 including a bypass valve, wherein, for example, coating can be applied to the walls of the inlet for the bypass valve and the walls of the inlet for the filter element, as well as to at least a portion of the valve such as a spring or washer (shown as a belleville washer, wherein at least the surface of the washer facing the inlet for the bypass is coated), the illustrated device 3000 also includes a porous filter 200' comprising a porous filter element 210' that can also be coated in accordance with an embodiment of the invention). The method comprises applying a coating composition, as described herein, to at least a portion of the surface of the article, and curing the coating composition to provide a coating comprising different layers with differing compositions. In particular, the coating comprises an outermost layer opposite of the surface (e.g., upstream surface of a filter medium) comprising a majority of the fluoro-substituted poly(alkyl siloxane) resin, an inner most layer adjacent to the upstream surface (e.g., upstream surface of a filter medium) comprising a majority of the epoxy resin, and an intervening layer between the outermost layer and innermost layer comprising a mixture of the fluoro-substituted poly(alkyl siloxane) resin and epoxy resin. As part of the method of inhibiting ice formation, the coating composition can be prepared prior to applying the coating composition as described herein.

In certain embodiments, the article to be coated is a filter device, which can comprise a porous medium and a housing having an inlet and an outlet and defining a fluid flow path between the inlet and the outlet with the porous medium across the fluid flow path (see, FIG. 4, showing a filter device 2000 comprising a filter 200 in a housing 10 arranged across the fluid flow path between the inlet 1 and the outlet 2). Both the porous medium and the housing can be coated, or either the porous medium or the housing. The porous medium forming the filter is as described herein. The housing includes any part that enables the use of the porous medium, such as a vessel, walls, fittings, a reservoir, etc. The porous medium forming the filter and the housing around the porous medium can be prepared from any suitable material that can withstand the operating temperatures and pressures of the filter device. The porous medium and housing can be formed of the same or different material as each other. They can be formed from a metallic material, a ceramic material, glass, a polymeric material, or a combination thereof, as described herein. The porous medium can be in the form of a permeable woven or nonwoven fibrous sheet, a permeable supported or unsupported membrane, or a permeable fibrous mass and may be fashioned from sintered metal particulates or fibers, glass fibers, or natural or synthetic polymers, including polymeric fibers or permeable polymeric sheets.

The housing preferably is composed of a metallic material or polymeric material. For example, the housing can be formed from stainless steel, polypropylene, or high density polyethylene. Typically, housings for aircraft filter devices are formed from a metal, such as aluminum, magnesium, stainless steel, or from a composite including metal. If desired, the housing can be manufactured by, for example, casting, additive manufacturing, extrusion, and light polymerization.

For example, the housing can monolithic, manufactured via additive manufacturing (sometimes referred to as "additive layer manufacturing" or "3D printing"), typically formed by repeated depositions of a metal powder bound together with an activatable binder (e.g., binder jetting, sometimes referred to as "drop on powder"), typically followed by agglomerating the powder, e.g., by sintering. Other suitable methods include extrusion (e.g., paste extrusion, fused filament fabrication and fused deposition modelling) and light polymerization (e.g., stereolithography apparatus (SLA), and digital light processing (DLP)).

As used herein the term "about" typically refers to ±1% of a value, ±5% of a value, or ±10% of a value.

The following examples further illustrate the invention but, of course, should not be construed as in any way limiting its scope.

Example 1

This example demonstrates a method of preparing a coating composition in accordance with an embodiment of the invention.

A stock solution of 98 vol % of acetone and 2 vol % benzyl alcohol was prepared. A mass of 8 mg (about 1 wt %) of SILASTIC™ LS-5-8725 fluorosilicone rubber was dissolved in the stock solution. To do this, the fluorosilicone rubber was cut into small pieces and then sonicated with a tight lid until dissolved. After several hours of sonication, the mixture was moved to a stir plate and stirred with a tight lid to prevent solvent from escaping. Once the fluorosilicone rubber was fully dissolved, 32 mg of the epoxy resin (Epic Resins A0222) was dissolved in the stock solution, so that the weight ratio of epoxy resin to fluorosilicone rubber was about 80:20. The coating was applied to the surface of a substrate, and the coating was cured in an oven in accordance with conditions recommended for the specific epoxy used.

Example 2

This example demonstrates a method of testing the icephobic property of a coating composition in accordance with an embodiment of the invention.

The 80:20 coating composition prepared in Example 1 was used. A similar coating composition was prepared with an epoxy resin:fluorosilicone rubber weight ratio of 90:10. Each coating composition was applied to an aluminum substrate to form a coating layer. A piece of sample ice was set atop the coated substrate, and a force was applied. The results of five test runs are set forth and averaged in Table 1.

TABLE 1

| Trial | 80:20 Coating | | | 90:10 Coating | | |
| --- | --- | --- | --- | --- | --- | --- |
| | N | kPa | psi | N | kPa | psi |
| 1 | 2.00 | 27.07 | 3.93 | 46.8 | 633.33 | 91.86 |
| 2 | 9.50 | 128.56 | 18.65 | 36.9 | 499.35 | 72.43 |
| 3 | 9.00 | 121.79 | 17.66 | 27.0 | 365.38 | 52.99 |
| 4 | 7.20 | 97.43 | 14.13 | 18.8 | 254.41 | 36.90 |
| 5 | 8.70 | 117.73 | 17.08 | 28.1 | 380.27 | 55.15 |
| average | 7.28 | 98.52 | 14.29 | 31.52 | 426.55 | 61.87 |

A coating is considered to be icephobic is the shear stress (Iice) is less than 100 kPa (14.5 psi)). As seen in Table 1, the 80:20 coating composition prepared in Example 1 was more than 4 times more effective in shedding ice than the 90:10 coating composition.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A coating composition comprising
an epoxy resin comprising poly(phenyl glycidyl ether)-co-formaldehyde and a curing agent;
a fluoro-substituted poly(alkyl siloxane) resin; and
a solvent mixture comprising
a first solvent with Hansen solubility parameters of $14 \leq \delta_D \leq 17$, $6 \leq \delta_P \leq 13$, and $4 \leq \delta_H \leq 8$; and
a second solvent with Hansen solubility parameters of $16 \leq \delta_D \leq 19$, $4 \leq \delta P \leq 9$, and $11 \leq \delta H \leq 15$.

2. The coating composition of claim 1, wherein the epoxy resin has a glass transition temperature of less than about 153° C.

3. The coating composition of claim 1, wherein the epoxy resin and fluoro-substituted poly(alkyl siloxane) resin are soluble in the solvent mixture.

4. The coating composition of claim 1, wherein the weight ratio of the epoxy resin to the fluoro-substituted poly(alkyl siloxane) resin is from 85:15 to 60:40.

5. The coating composition of claim 1, wherein the volume ratio of first solvent to the second solvent is from 90:10 to 98:2.

6. A method of forming a coated article comprising applying the coating composition of claim 1 to at least a portion of the surface of the article.

7. The method of claim 6, further comprising preparing the coating composition prior to applying the coating composition, wherein preparing the coating composition comprises the following:
providing a mixed solvent comprising the first solvent and second solvent,
dissolving the fluoro-substituted poly(alkyl siloxane) resin in the mixed solvent, and followed by
dissolving the epoxy resin in the mixed solvent.

8. The method of claim 7, wherein the solution comprises up to about 1.25 wt % of dissolved fluoro-substituted poly(alkyl siloxane) resin.

9. The method of claim 6, wherein applying the coating composition comprises spraying, dipping, spinning, wiping, rolling, or a combination thereof.

10. The method of claim 6, wherein the coating composition is subjected to curing after applying the coating composition.

11. The method of claim 10, wherein the curing takes place after a majority of the first solvent has evaporated from the coating composition.

12. A coated filter comprising a porous medium having an upstream surface and a downstream surface, wherein the upstream surface has a coating formed from the coating composition of claim 1.

13. The coated filter of claim 12, wherein the coating has a thickness of 1-500 μm.

14. The coated filter of claim 12, wherein the coating comprises an outermost layer opposite of the upstream surface comprising a majority of the fluoro-substituted poly(alkyl siloxane) resin, an inner most layer adjacent to the upstream surface comprising a majority of the epoxy resin, and an intervening layer between the outermost layer and innermost layer comprising a mixture of the fluoro-substituted poly(alkyl siloxane) resin and epoxy resin.

15. A method of inhibiting ice formation on a surface of an article comprising:
applying the coating composition of claim 1 to at least a portion of the surface of the article, and
curing the coating composition to provide a coating comprising different layers with differing compositions.

16. The method of claim 15, wherein the coating comprises an outermost layer opposite of the surface comprising a majority of the fluoro-substituted poly(alkyl siloxane) resin, an inner most layer adjacent to the surface comprising a majority of the epoxy resin, and an intervening layer between the outermost layer and innermost layer comprising a mixture of the fluoro-substituted poly(alkyl siloxane) resin and epoxy resin.

17. The method of claim 15, further comprising preparing the coating composition prior to applying the coating composition, wherein preparing the coating composition comprises the following:
providing a mixed solvent comprising the first solvent and second solvent,
dissolving the fluoro-substituted poly(alkyl siloxane) resin in the mixed solvent, and followed by
dissolving the epoxy resin in the mixed solvent.

18. The method of claim 15, wherein the article is a filter device.

19. The method of claim 18, wherein the filter device comprises a porous medium and a housing having an inlet and an outlet and defining a fluid flow path between the inlet and the outlet with the porous filter element arranged in the housing across the fluid flow path.

* * * * *